3,009,903
MANUFACTURE OF HIGH LINEAR POLYESTERS FROM REFRACTORY AROMATIC DICARBOXYLIC ACIDS AND CYCLIC GLYCOL CARBONATES
James Lincoln, Putteridge Bury, near Luton, England, assignor to British Celanese Limited, a company incorporated of Great Britain
No Drawing. Filed May 7, 1957, Ser. No. 657,494
Claims priority, application Great Britain May 18, 1956
6 Claims. (Cl. 260—75)

This invention relates to the production of high linear polyesters, i.e. linear polyesters of intrinsic viscosity substantially above 0.4 and preferably above 0.5% and is an improvement in or modification of the invention described in U.S. application Ser. No. 302,822, filed August 5, 1952, now matured as U.S. Patent 2,799,667 of July 16, 1957.

U.S. application Ser. No. 302,822 describes a process for making high linear polyesters by condensing a free dicarboxylic acid with a cyclic glycol carbonate, for example cyclic ethylene carbonate, cyclic trimethylene carbonate or the cyclic carbonate of propylene glycol. The process is applicable to the production of linear polyesters from aliphatic dicarboxylic acids, for example adipic acid, suberic acid and sebacic acid, and aromatic-aliphatic dicarboxylic acids such as p-phenylene-diacetic acid. However its principal advantages are obtained in the production of high melting polyesters from aromatic dicarboxylic acids which are refractory, in the sense that they are high melting and difficult to dissolve, and in particular terephthalic acid. By using a cyclic glycol carbonate a smoother reaction is achieved than when the free dicarboxylic acid is reacted with the free glycol, since the reaction mixture becomes homogeneous more rapidly.

A modification of this process is described in U.S. application Ser. No. 494,574, filed March 15, 1955, now matured to U.S. Patent 2,799,664 of July 16, 1957, in which the dicarboxylic acid and the cyclic glycol carbonate are brought into contact with preformed low polyester of intrinsic viscosity 0.1–0.4 and especially 0.15–0.3. The amount of preformed linear polyester is preferably at least half the combined weights of the dicarboxylic acid and cyclic glycol carbonate, and may be considerably more. The reaction is found to go more rapidly than, and as smoothly as, in the absence of the preformed low linear polyester.

In the processes described in these specifications, there may be present in the initial reaction mixture an ester-interchange catalyst. Many such catalysts have been described in connection with the production of high linear polyesters by the reaction of an alkyl ester of a dicarboxylic acid and a free glycol. One good example is magnesium metal, and many others will be found mentioned in the literature of the subject, including British specification No. 742,811, French specification No. 1,102,786 and U.S. specifications Nos. 2,720,502–7, 2,727,881, 2,729,619 and 2,729,620. Moreover the sodium terephthalate which is frequently present as an impurity in commercial terephthalic acid has been found to function as an ester-interchange catalyst.

Other catalysts, including aluminates and antimony compounds, have been described whose activity appears to be confined either wholly or mainly to the actual polyesterification reaction, since when they are used to catalyse the production of polyesters from dicarboxylic esters and glycols, the best results are only obtained when they are used in association with an ester-interchange catalyst. Some catalysts, such as manganese compounds, combine both roles, serving to catalyse both the initial ester-interchange between the dicarboxylic acid and the glycol, and also the subsequent polyesterification.

According to the present invention, high linear polyesters are made by heating a mixture comprising a free dicarboxylic acid and a cyclic glycol carbonate, preferably in the presence of an ester-interchange catalyst, to a temperature at which polycondensation takes place for a period at least sufficient to cause the mixture to become substantially homogeneous in appearance, then adding as a second stage catalyst a metal or metal compound capable of catalysing ester-interchange reactions or polyesterification reactions or reactions of both types, and heating the resulting composition until a high linear polyester has been formed. (For the purpose of this specification the term "metal" is employed to include the so-called metalloids.) Preferably the intrinsic viscosity of the polyester when the additional catalyst is added to it is at least 0.1, and especially between 0.1 and 0.4.

One valuable result of adding a catalyst as described above is to cause the polyesterification to proceed more rapidly, and so to reduce the time required to produce a polyester of intrinsic viscosity high enough to give it fibre-forming properties. The use of the term "second stage catalyst" to denote the catalyst added to the homogeneous reaction mixture in accordance with the invention is not intended to imply that the first stage of the reaction must necessarily be carried out in the presence of a catalyst, though normally it will be. Any of the known ester-interchange and polyesterification catalysts may be used as the second stage catalyst, compounds which will dissolve at least to some extent in the reaction mixture being preferred. In accordance with one mode of operation the free dicarboxylic acid and the cyclic glycol carbonate are added to a melt of the preformed linear polyester of intrinsic viscosity 0.1–0.4 which polyester may be present in at least half the combined weight of acid and carbonate. The resulting mixture is heated until a linear polyester of intrinsic viscosity 0.1–0.4 has been formed from the dicarboxylic acid and the cyclic glycol carbonate the second stage catalyst being added at any time after the intrinsic viscosity of the linear polyester in the mixture has reached 0.1. The addition of acid and carbonate may be continuous in which event an equivalent quantity of molten linear polyester of intrinsic viscosity 0.1–0.4 will be continuously withdrawn. To this withdrawn mass the second stage catalyst will be added so as to promote further polymerisation to give a fibre-forming linear polyester.

The invention is of particular importance in connection with methods of carrying out the processes of U.S. application Ser. No. 302,822 and U.S. application Ser. No. 494,574, in which two or more separate stages are employed, the product of the first of which is a low polyester having an intrinsic viscosity of 0.1–0.4, and preferably 0.15–0.3. One such method is described in detail in U.S. application Ser. No. 494,574, and consists in first forming a low polyester of the desired intrinsic viscosity (in this case by the reaction of the dicarboxylic acid and cyclic glycol carbonate with preformed low polyester, preferably in a continuous manner), and then heating this low polyester further under polyesterification conditions; this further heating is preferably divided into two stages, in the first of which atmospheric pressure is employed, and in the second a high or fairly high degree of vacuum, especially a pressure below 5 mm. of mercury. When the invention is applied to such methods of working the second stage catalyst is added to low polyester first produced, either at the end of the first stage of the process or at some point during the first stage at which the reaction mixture has a homogeneous appearance and preferably at which the linear polyester of which it essentially consists has an intrinsic viscosity of at least 0.1.

It may be noted here that although polyesterification catalysts, like ester-interchange catalysts, can be present in the initial reaction mixture, the formation of the high linear polyester is not then accelerated to the same degree as when "second stage catalyst" is used. This is surprising and not easy to explain; it is possible that by adding the catalyst at a later point in the process a more uniform distribution results, though it is by no means clear why this should be so.

Examples of substances which may be used as second stage catalysts in the process of the invention are those listed in the specifications referred to above (namely magnesium, sodium, mixtures of magnesium and sodium, lithium, and alkoxides of these metals), and also compounds of manganese, especially manganese salts of organic acids such as manganous acetate; compounds of antimony, especially salts (including double salts) of organic acids such as antimony potassium tartrate, and salts in which the antimony is present in the anion such as alkali metal antimonates; salts in which aluminium or zinc is present in the anion such as the alkali and alkaline earth metal aluminates and the alkali metal zincates; and compounds, especially organic acid salts, of iron, cobalt, copper and lead. Of these the manganese, zinc, aluminium and antimony compounds are preferred.

The second stage catalyst may be added to the reaction mixture as a powdered solid or as a dispersion in a suitable organic liquid, for example a glycol or a mixture of a glycol with water, or a mixture of a cyclic glycol carbonate with water. For example, when the linear polyester is being made by a multistage process as described above, the low polyester first obtained may be allowed to become solid and may then be powdered, and the second stage catalyst intimately mixed with the powdered polyester in any suitable way, either as a solid or dispersed in a liquid. Alternatively the catalyst may be added to the molten low polyester. If it is desired to add a delustrant such as titanium dioxide or another pigment or any similar effect material to the reaction mixture, it may conveniently be added with the catalyst, e.g. dispersed in the same organic liquid. However if desired the catalyst and effect material may be added separately, at least the latter preferably as a dispersion in an organic liquid either at the same or at different points in the process.

Quite small proportions of second stage catalyst are needed, and it is preferable to employ only so much as will cause the polyesterification to proceed at the desired rate. Generally speaking the amount of such catalyst, reckoned as its metal component or components, should be below 0.05% and preferably below 0.03%, e.g. between about 0.002 and 0.02%, of the weight of high linear polyester theoretically obtainable from the amount of dicarboxylic acid employed. If too high a proportion of the catalyst is used, the polyester finally obtained may be discoloured.

The conditions employed for the polyesterification following the introduction of the second stage catalyst, apart from the presence of this catalyst, may be those described in U.S. application Ser. No. 302,822 or U.S. application Ser. No. 494,574. Usually temperatures of about 250°–300° C. are suitable, in combination with operating pressures which may be atmospheric for the first part of the polyesterification, but are preferably quite low, especially below 5 mm. of mercury, at least for the last part. Oxygen should of course be excluded from the polymerisation zone.

The invention is illustrated by the following examples.

*Example I*

Equivalent amounts of terephthalic acid, containing a small proportion of sodium terephthalate as an impurity, and ethylene carbonate were heated with about 0.7% of magnesium ribbon in an atmosphere free from oxygen and water vapour to a temperature of 270°–280° C. The reaction mixture was continuously stirred as soon as it had become sufficiently fluid, and after a total of 4½ hours an almost transparent homogeneous melt had been produced. There was then added to the mixture 0.3% of its weight of titanium dioxide pigment as a 15% dispersion in a mixture of equal volumes of ethylene carbonate and water, after which heating was continued for another half hour. At this stage the product was a low polyester of intrinsic viscosity about 0.2.

The magnesium ribbon was now removed and a dispersion of 0.025% of manganous acetate tetrahydrate in a mixture of equal volumes of ethylene carbonate and water was added, and heating was continued, again in the absence of oxygen, for a further 1½ hours under atmospheric pressure, followed by 1½ hours under a pressure of 0.3–0.5 mm. of mercury, the temperature being maintained at about 275° C. throughout. The polyethylene terephthalate obtained was of excellent colour and had an intrinsic viscosity of 0.53. The titanium dioxide was uniformly dispersed throughout the polymer. By continuing the heating for longer times polyethylene terephthalates of higher intrinsic viscosities and having excellent fibre-forming properties could be obtained.

*Example II*

A low polyethylene terephthalate of intrinsic viscosity about 0.27 was heated in the absence of oxygen to 275° C. after adding to it 0.3% of manganous acetate tetrahydrate dispersed in aqueous ethylene glycol or aqueous ethylene carbonate. Heating was continued for 3 hours, the pressure in the final stage being reduced to 0.5 mm. of mercury. The polyethylene terephthalate obtained was of good colour and had an intrinsic viscosity of 0.70.

While the figures for the intrinsic viscosity given in the remainder of the specification and the claims are as determined on a solution of 1 gram of the polyester in 100 cc. of m-cresol, as described in U.S. application Ser. No. 302,822 and U.S. application Ser. No. 494,574, those given in Examples 1 and 2 above were obtained using as solvent a mixture of 3 parts by weight of phenol to 1 part by weight of tetrachloroethane, the other conditions remaining the same. The figures so obtained are greater than those obtained using m-cresol as the solvent by a factor in the neighbourhood of 1.3. The proportions of manganous acetate tetrahydrate are expressed as percentages of the theoretical yield of polyethylene terephthalate. Other ester-interchange or polyesterification catalysts could be used instead of the manganous acetate, e.g. potassium antimony tartrate or sodium aluminate.

While the invention has been described with particular reference to the production of polyethylene terephthalate, it is applicable also to the manufacture of high linear polyesters (including polyether esters as described in U.S. application Ser. No. 374,825, filed August 17, 1953), derived from other dicarboxylic acids, including aliphatic dicarboxylic acids such for example as adipic acid, and/or other glycols. Examples of such other dicarboxylic acids and glycols are given in U.S. application Ser. No. 302,822, and include suberic acid, sebacic acid, paraphenylene diacetic acid, certain substituted terephthalic acids, diphenyl-4.4'-dicarboxylic acid, α.β-diphenylethane-4.4'-di-carboxylic acid, α.δ-diphenylbutane-4.4'-dicarboxylic acid and other α.ω-diphenylalkane-4.4'-dicarboxylic acids, α.β-diphenoxyethane-4.4'-dicarboxylic acid, α.δ-diphenoxybutane-4.4'-dicarboxylic acid and other α.ω-diphenoxyalkane-4.4'-dicarboxylic acids, and the 1.5-, 2.6- and 2.7-naphthalene-dicarboxylic acids; and trimethylene and propylene glycols.

Having described my invention, what I desire to secure by Letters Patent is:

1. A process which comprises continuously adding a free refractory aromatic dicarboxylic acid and a cyclic glycol carbonate to at least half their combined weight of a melt of a preformed low linear polyester of said acid and said carbonate of intrinsic viscosity between 0.1 and 0.4, said aromatic dicarboxylic acid being selected from the group consisting of terephthalic acid, para-phenylene diacetic acid, diphenyl-4.4'-dicarboxylic acid, α,ω-diphenylalkane-4.4'-dicarboxylic acids, α,ω-diphenoxyalkane-4.4'-dicarboxylic acids, 1.5-naphthalene-dicarboxylic acid, 2,6-naphthalene-dicarboxylic acid and 2.7 naphthalene-dicarboxylic acid, heating and reacting said acid and said carbonate in the resulting mixture to form additional low linear polyester of intrinsic viscosity between 0.1 and 0.4, continuously withdrawing from said mixture a quantity of molten linear polyester of intrinsic viscosity between 0.1 and 0.4 equivalent to the amount of acid and carbonate added thereto, mixing with said withdrawn linear polyester a catalytic amount of a polyesterification catalyst selected from the group consisting of organic carboxylic acid salts of manganese and antimony, alkali metal antimonates, alkali and alkline earth metal aluminates and alkali metal zincates, and further heating the mixture of catalyst and withdrawn linear polyester to increase the intrinsic viscosity and produce a fibre-forming linear polyester.

2. Process according to claim 1 wherein a temperature of about 250 to 300° C. is maintained for said further heating step.

3. Process according to claim 2 wherein atmospheric pressure is maintained for the first part of the said further heating step and a pressure below 5 mm. of mercury is maintained for the last part thereof.

4. Process according to claim 1 wherein the amount of polyesterification catalyst reckoned as its metal component is below 0.03% but above 0.002% of the weight of the high linear polyester.

5. Process according to claim 1 wherein the dicarboxylic acid is terephthalic acid.

6. Process according to claim 1 wherein the cyclic glycol carbonate is cyclic ethylene carbonate.

References Cited in the file of this patent

UNITED STATES PATENTS

| | | |
|---|---|---|
| 2,465,319 | Whinfield | Mar. 22, 1949 |
| 2,758,915 | Nodonik | Aug. 14, 1956 |
| 2,870,124 | Ham | Jan. 20, 1959 |

FOREIGN PATENTS

| | | |
|---|---|---|
| 1,005,514 | France | Apr. 11, 1952 |